US012715718B2

(12) United States Patent
Wang et al.

(10) Patent No.: US 12,715,718 B2
(45) Date of Patent: Aug. 25, 2026

(54) ARTICLE LOADING AND UNLOADING EQUIPMENT AND ARTICLE LOADING AND UNLOADING SYSTEM

(71) Applicant: BEIJING JINGDONG QIANSHI TECHNOLOGY CO., LTD., Beijing (CN)

(72) Inventors: Xianwang Wang, Beijing (CN); Weiquan He, Beijing (CN); Jian Zhang, Beijing (CN); Yafang Zhang, Beijing (CN); Yubo Zhou, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 701 days.

(21) Appl. No.: 18/007,349

(22) PCT Filed: Mar. 26, 2021

(86) PCT No.: PCT/CN2021/083113
§ 371 (c)(1),
(2) Date: Jan. 30, 2023

(87) PCT Pub. No.: WO2022/027980
PCT Pub. Date: Feb. 10, 2022

(65) Prior Publication Data

US 2024/0253916 A1 Aug. 1, 2024

(30) Foreign Application Priority Data

Aug. 3, 2020 (CN) ......................... 202010768197.9

(51) Int. Cl.
*B65G 67/08* (2006.01)
*B65G 41/00* (2006.01)
(Continued)

(52) U.S. Cl.
CPC ........... *B65G 67/08* (2013.01); *B65G 41/008* (2013.01); *B65G 47/00* (2013.01); *B65G 67/24* (2013.01)

(58) Field of Classification Search
CPC ...... B65G 67/08; B65G 67/24; B65G 41/008; B65G 47/00
See application file for complete search history.

(56) References Cited

U.S. PATENT DOCUMENTS 4,295,560 A 10/1981 Cross
8,272,334 B2 * 9/2012 Wang .................... G05G 11/00 108/143

(Continued)

FOREIGN PATENT DOCUMENTS

CN 201785036 U 4/2011
CN 203006509 U 6/2013

(Continued)

OTHER PUBLICATIONS

Notice of Reasons for Refusal and English language translation, JP Application No. 2022-574256, Feb. 25, 2025, 13 pp.

(Continued)

*Primary Examiner* — Saul Rodriguez
*Assistant Examiner* — Ashley K Romano
(74) *Attorney, Agent, or Firm* — Myers Bigel, P.A.

(57) ABSTRACT

Disclosed are article loading and unloading equipment and an article loading and unloading system, relating to the field of logistics machinery, for improving the performance of article loading and unloading equipment. The article loading and unloading equipment comprise a base assembly, a cantilever assembly and a conveying assembly. The base assembly is configured to provide support. The cantilever assembly comprises a first bracket assembly and a first conveyor, the first bracket assembly being mounted to the (Continued)

base assembly; and the first conveyor being mounted to the first bracket assembly. The conveying assembly comprises a second bracket assembly, a second conveyor and a suction cup assembly, the second bracket assembly being mounted to the first bracket assembly, the second conveyor being mounted to the second bracket assembly, and the suction cup assembly being rotatably mounted to the second bracket assembly; and the suction cup assembly being configured to adsorb an article to the second conveyor. A conveying direction of the first conveyor and a conveying direction of the second conveyor are the same. The article loading and unloading equipment provided in the above technical solution does not need to change directions in the process of conveying the article, so the continuity of conveying operations is improved and the conveying efficiency is increased.

16 Claims, 5 Drawing Sheets

(51) Int. Cl.
*B65G 47/00* (2006.01)
*B65G 67/24* (2006.01)

(56) References Cited

U.S. PATENT DOCUMENTS

2013/0041505 A1* 2/2013 Cox .................. H01L 21/67742 901/29
2015/0037131 A1* 2/2015 Girtman ............... B25J 15/0052 414/797
2018/0072517 A1* 3/2018 Girtman ................. B65G 67/26
2018/0118476 A1* 5/2018 Bastian, II ............. B65G 67/08
2018/0362270 A1* 12/2018 Clucas ....................... B25J 5/00
2019/0313555 A1* 10/2019 Matsumoto .......... H05K 13/022
2021/0122589 A1* 4/2021 Griggs ................... G01N 21/84
2021/0188544 A1* 6/2021 Austrheim ........... G05D 1/0291
2023/0227266 A1* 7/2023 Morimoto ................. E02F 7/00 198/300
2024/0010426 A1* 1/2024 Mayadeen ........... B65G 1/0478

FOREIGN PATENT DOCUMENTS

CN 204450530 U 7/2015
CN 205312688 U 6/2016
CN 106044224 A 10/2016
CN 106477349 A 3/2017
CN 207090561 U 3/2018
CN 207312692 U 5/2018
CN 106477349 B 11/2018
CN 109789905 A 5/2019
CN 209582812 U 11/2019
CN 209601512 U 11/2019
CN 112278911 A 1/2021
DE 2520565 A1 11/1976
DE 2941127 A1 4/1980
EP 1879822 B1 3/2013
JP S51031278 U 3/1976
JP S5931224 A 2/1984
JP 2019534223 A 11/2019
WO 2018081565 A1 5/2018
WO 2020243749 A1 12/2020

OTHER PUBLICATIONS

"Communication with Supplementary European Search Report", EP Application No. 21852937.8, Jul. 19, 2024, 7 pp.
"First Office Action and English language translation", CN Application No. 202010768197.9, Nov. 29, 2021, 22 pp.
"International Search Report and English language translation", International Application No. PCT/CN2021/083113, Jun. 23, 2021, 6 pp.
"Second Office Action and English language translation", CN Application No. 202010768197.9, Jun. 6, 2022, 17 pp.

* cited by examiner

ARTICLE LOADING AND UNLOADING EQUIPMENT AND ARTICLE LOADING AND UNLOADING SYSTEM

CROSS-REFERENCE TO RELATED APPLICATIONS

The present application is a U.S. National Stage Application under 35 U.S.C. § 371 of International Patent Application PCT/CN2021/083113, filed on Mar. 26, 2021, which itself claims priority to Chinese Patent Application No. 202010768197.9 filed on Aug. 3, 2020, the disclosures of both of which are hereby incorporated in their entirety by reference.

FIELD OF THE INVENTION

The present disclosure relates to the field of logistics machinery, in particular to article loading and unloading equipment and an article loading and unloading system.

DESCRIPTION OF RELATED ART

In the field of logistics, goods are unloaded to a warehouse by using a hydraulic handling truck, a telescopic conveying belt, a cantilever conveying belt, etc. specifically in such a manner that the goods are carried manually to equipment, and then the goods are transported into the warehouse by the equipment. Alternatively, goods are unloaded from a truck and transported to a warehouse by means of a forklift for carrying the goods. A process of loading from a warehouse for goods delivery is the reverse of the unloading work process but uses the same equipment. The inventors found that there are at least the following problems in the related art: the use of a hydraulic handling truck, a telescopic conveying belt, a cantilevered second conveying belt, etc., whether in unloading or loading, needs a lot of labor, high labor intensity, and a high labor cost, with labor consumption at both an unloading end of the truck and a palletizing end of the warehouse.

In the related art, another type of unloading equipment is an unloading vehicle including a conveying belt capable of conveying goods laterally and an end picker capable of moving longitudinally. The end picker is provided with several rows of suction cups that move with the end picker in a longitudinal, i.e., front-rear, direction of the vehicle to drag goods from elsewhere to the unloading vehicle. The suction cups drag the goods to a lateral conveying line on the end picker, then the goods are conveyed along the lateral conveying line to a lateral end of the end picker, and subsequently the goods are conveyed backward by a jacking transplanting device to a stock-in conveying line connected to a rear end of the lateral conveying line, which conveys the goods into a warehouse.

The inventors found that there are at least the following problems in the related art: in such a solution, on the one hand, the movement direction of the suction cups of the end picker is perpendicular to the conveying direction of the goods, and after the suction cups suck the goods, the goods are conveyed laterally by the conveying line and then turned, and the subsequent operations involve frequent transitions, which affects the continuity of absorbing the goods by the suction cups and leads to low efficiency. On the other hand, the end pickup has a limited length (the dimension in an extending and retracting direction of the end pickup) and a very large width, and thus is well adaptable for trucks parked laterally, but is not suitable for loading to (unloading from) rear-door vans. Moreover, the equipment needs to be operated by a person, and a workbench for the operating person is on a vehicle body. For loading (unloading) goods at high positions, accidents are liable to occur due to poor visibility. Thus, such a loading and unloading vehicle is subject to many restrictions in actual use, and its use scope is limited.

SUMMARY OF THE INVENTION

The present disclosure relates to an article loading and unloading equipment and an article loading and unloading system, for improving the performance of article loading and unloading equipment.

In some embodiments of the present disclosure, provided is article loading and unloading equipment including a base assembly, a cantilever assembly and a conveying assembly, wherein the base assembly is configured to provide support for the equipment; the cantilever assembly includes a first bracket assembly and a first conveyor, the first bracket assembly being mounted to the base assembly; and the first conveyor being mounted to the first bracket; the conveying assembly includes a second bracket assembly, a second conveyor and a suction cup assembly, the second bracket assembly being mounted to the first bracket assembly, the second conveyor being mounted to the second bracket assembly, and the suction cup assembly being rotatably mounted to the second bracket assembly; and the suction cup assembly being configured to adsorb an article to the second conveyor, wherein a conveying direction of the first conveyor and a conveying direction of the second conveyor are the same.

In some embodiments, the article loading and unloading equipment further includes a rotation drive mechanism arranged between the base assembly and the cantilever assembly to drive the cantilever assembly to rotate relative to the base assembly around a rotation shaft which is vertically oriented.

In some embodiments, the article loading and unloading equipment further includes a support bracket in driving connection with the rotation drive mechanism, the first bracket assembly being mounted to the support bracket; and the rotation drive mechanism driving, through the support bracket, the cantilever assembly to rotate relative to the base assembly.

In some embodiments, the support bracket includes a base plate and a first linkage mechanism, wherein the rotation drive mechanism is in driving connection with the base plate; and the first linkage mechanism is hinged to the base plate, and the first bracket assembly is hinged to the first linkage mechanism.

In some embodiments, the first linkage mechanism includes at least three mutually parallel first rods and a plurality of second rods, wherein one end of each first rods is hinged to the base plate; every two adjacent first rods are hinged to one of the second rods; and the first bracket assembly is hinged to the second rods.

In some embodiments, the article loading and unloading equipment further includes a linkage drive mechanism mounted on the base plate and in driving connection with the second rods, the linkage drive mechanism being configured to drive, through the first linkage mechanism, the cantilever assembly to move relative to the base assembly along a length direction thereof.

In some embodiments, the article loading and unloading equipment further includes a pitch drive mechanism arranged between the base plate and the cantilever assembly, or between the base assembly and the cantilever assembly, the pitch drive mechanism being configured to drive the cantilever assembly to perform pitch rotation relative to the base assembly.

In some embodiments, the first bracket assembly includes parallelogram mechanisms including two sets, two parallelogram mechanisms in each set being arranged in parallel, and the first conveyor being located between the two sets of parallelogram mechanisms, wherein the parallelogram mechanisms in each set are pivotally connected by horizontal shafts, and the horizontal shafts are hinged to the second rods.

In some embodiments, the second bracket assembly is pivotally connected to the first bracket assembly.

In some embodiments, the article loading and unloading equipment further includes a horizontal rotation drive mechanism arranged between the second bracket assembly and the first bracket assembly to drive the second bracket assembly to rotate relative to the first bracket assembly around a rotating shaft which is vertically oriented.

In some embodiments, the suction cup assembly is mounted to the second bracket assembly, and the suction cup assembly is configured to switch between an adsorbed position and a non-adsorbed position, wherein when the suction cup assembly is in the non-adsorbed position, the suction cup assembly is located outside a motion trail of the article on the second conveyor (so as to avoid interfering with the motion of the article along the second conveyor.

In some embodiments, the article loading and unloading equipment further includes a linkage drive mechanism arranged between the base assembly and the cantilever assembly to drive the cantilever assembly to move relative to the base assembly along a length direction thereof.

In some embodiments, the article loading and unloading equipment further includes a pitch drive mechanism arranged between the base assembly and the cantilever assembly to drive the cantilever assembly to perform pitch rotation relative to the base assembly.

In some embodiments, the base assembly includes a chassis and traveling wheels, wherein the cantilever assembly is mounted to the chassis; and the traveling wheels are mounted to the chassis.

In some embodiments, the conveying direction of the first conveyor and the conveying direction of the second conveyor are the same, or an included angle between the conveying direction of the first conveyor and the conveying direction of the second conveyor is greater than 0° and less than or equal to 20°.

In some embodiments, the first conveyor includes at least one of a conveying belt and a conveying roller; and/or the second conveyor includes at least one of a conveying belt and a conveying roller.

In other embodiments of the present disclosure, provided is an article loading and unloading system including the article loading and unloading equipment provided in any technical solution of the present disclosure.

In some embodiments, the article loading and unloading system further includes a first conveying line arranged on a side of the first conveyor away from the second conveyor, the conveying line being configured to convey an article to the first conveyor or to receive an article conveyed from the first conveyor.

In some embodiments, the article loading and unloading system further includes a second conveying line, the position of the first conveyor being higher than that of the first conveying line, the second conveying line being arranged obliquely and located between the first conveying line and the first conveyor.

The article loading and unloading equipment provided in the above technical solution is provided with the cantilever assembly and the conveying assembly. The conveying assembly adsorbs the article from the truck and conveys the same to the cantilever assembly for further conveying, or the adsorbing assembly receives the article conveyed from the cantilever assembly and then conveys the same to the truck. Since the first conveyor of the cantilever assembly is located in the conveying direction of the second conveyor of the conveying assembly, there is no need to change directions in the process conveying the article from the first conveyor to the second conveyor and in the process conveying the article from the second conveyor to the first conveyor, which greatly improves the continuity of conveying operations and increases conveying efficiency; and as the length of the second conveyor can be set arbitrarily, it is applicable regardless of whether the truck is of a side-door structure or a rear-door structure, thus greatly increasing the application scenarios of the article loading and unloading equipment.

DESCRIPTION OF THE INVENTION

Figure 1:
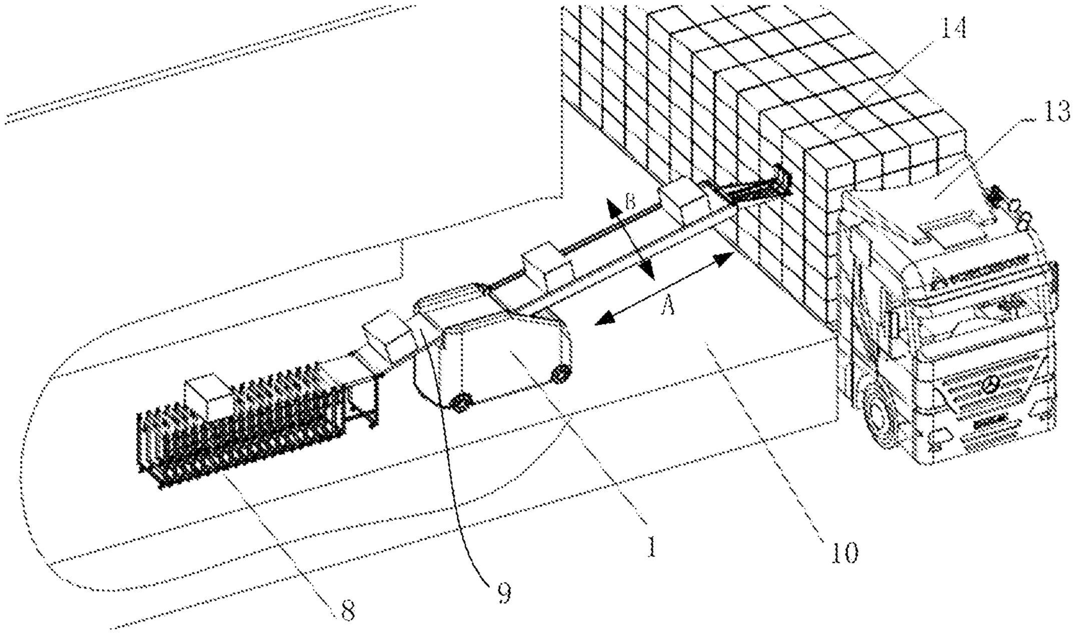
FIG. 1 is a schematic diagram of article loading and unloading system provided in some embodiments of the present disclosure in a state of use.

Technical solutions provided in the present disclosure are described in more detail below in conjunction with FIGS. 1 to 11.

Referring to FIGS. 1 to 9, in some embodiments of the present disclosure, provided is article loading and unloading equipment including a base assembly 1, a cantilever assembly 2 and a conveying assembly 3. The base assembly 1 is configured to provide support. The cantilever assembly 2 includes a first bracket assembly 21 and a first conveyor 22, the first bracket assembly 21 being mounted to the base assembly 1. The first conveyor 22 is mounted to the first bracket assembly 21. The conveying assembly 3 includes a second bracket assembly 31, a second conveyor 32 and a suction cup assembly 33, the second bracket assembly 31 being mounted to the first bracket assembly 21, the second conveyor 32 being mounted to the second bracket assembly 31, and the suction cup assembly 33 being rotatably mounted to the second bracket assembly 31, specifically rotatable around a shaft D. The suction cup assembly 33 is configured to adsorb an article 14 to the second conveyor 32. A conveying direction of the first conveyor 22 and a conveying direction of the second conveyor 32 are the same. Consistency includes a situation where the conveying directions are exactly the same, and a situation where an included angle between the conveying directions is 0-20° (which is also called a situation where the conveying directions are substantially the same). See FIGS. 3 and 5 for the situation where the conveying direction of the first conveyor 22 and the conveying direction of the second conveyor 32 are the same, and see FIG. 7 for the situation where the conveying direction of the first conveyor 22 and the conveying direction of the second conveyor 32 are at an included angle. A direction A in FIG. 3 indicates a direction of cargo movement.

The base assembly 1 serves as a mounting base and provides support for the cantilever assembly 2. A chassis 11 of the article loading and unloading equipment has degrees of freedom of left-right movements, front-rear movements, steering and the like. The article loading and unloading equipment using the multi-degree-of-freedom chassis 11 achieves multi-degree-of-freedom movements such as front-rear, left-right, and rotational movements of a vehicle body. The cantilever assembly 2 is supported by the base assembly 1 during loading and unloading and when not in operation. The suction cup assembly 33 includes a mounting substrate and suction cups. The mounting substrate is hollow, and the suction cups are mounted to the mounting substrate, and the suction cups are connected to a vacuum pipeline through the mounting substrate. An electronically controlled vacuum valve is installed in the vacuum pipeline, and the vacuum valve has the functions of enabling and disabling the vacuum, which can achieve adsorption and release operations of the article 14. The suction cup assembly 33 has two positions: an adsorbed position and a non-adsorbed position. For example, multiple drive elements, such as motors, cooperate to enable the suction cup assembly 33 to switch between the adsorbed position and the non-adsorbed position.

The cantilever assembly 2 is configured to receive the article 14 conveyed by the conveying assembly 3 to put the article 14 in storage i.e., unloading; and the cantilever assembly 2 can also convey the article 14 to the conveying assembly 3 to take the article 14 out of storage, i.e., loading. The cantilever assembly 2 is located in the conveying direction of the conveying assembly 3, so the conveying direction does not need to be changed when the article 14 is transported between the cantilever assembly 2 and the conveying assembly 3. This greatly reduces the phenomenon of unsmooth conveying and low conveying efficiency caused by the change of the conveying direction of the article 14, and improves the efficiency and reliability of loading and unloading operations. In the above technical solution, due to the long cantilever structure and the very narrow conveying assembly 3, it is adaptable to loading/unloading work regardless of a flat bogie wagon 13 parked laterally or a rear-door truck 13 parked longitudinally.

The first conveyor 22 includes at least one of a conveying belt and a conveying roller; and/or the second conveyor 32 includes at least one of a conveying belt and a conveying roller. In the following description, both the first conveyor 22 and the second conveyor 32 are conveying belts.

Specific implementations of components are described in detail below.

Referring to FIGS. 1, 2, 4 to 6, in some embodiments, the base assembly 1 includes a chassis 11 and traveling wheels 12. The cantilever assembly 2 is mounted to the chassis 11. The traveling wheels 12 are mounted to the chassis 11. The movement of the whole article loading and unloading equipment is conveniently changed by using the traveling wheels 12 to meet loading and unloading needs at different locations in the same warehouse, in different warehouses and for different articles 14. A direction M1 in FIG. 4 indicates a direction of front-rear movements of a cantilever, and a direction M2 indicates a direction of pitch rotation of the cantilever. In addition, a direction M3 in FIG. 5 indicates a direction of left-right movements of the chassis assembly, a direction M4 indicates a direction of front-rear movements of the chassis assembly, a direction M5 indicates a steering direction of the chassis assembly, and a direction M6 indicates a direction of left-right oscillations of the cantilever assembly.

The cantilever assembly 2 is mounted to the chassis 11, and an attitude adjustment structure can be provided to change the attitude of the cantilever assembly 2 with respect to the chassis 11. The attitude includes at least one of the following: a pitch angle of the cantilever assembly 2 relative to the chassis 11, the position of the cantilever assembly 2 along the length thereof, and rotating of the cantilever assembly 2 around a vertical shaft. In some embodiments, the cantilever assembly 2 can have at least one of the above adjustment modes, and preferably, the cantilever assembly 2 has the above three adjustment modes, so that the cantilever assembly 2 has degrees of freedom of pitch rotation, front-rear movements and left-right movements. How to implement attitude adjustment of cantilever assembly 2 is described in detail below.

Referring to FIGS. 1 to 4, in some embodiments, the article loading and unloading equipment further includes a rotation drive mechanism 4. The rotation drive mechanism 4 is arranged between the base assembly 1 and the cantilever assembly 2 to drive the cantilever assembly 2 to rotate relative to the base assembly 1 around a rotation shaft which is vertically oriented.

The rotation drive mechanism 4 is, for example, a rotary motor, which is mounted to the chassis 11 of the base assembly 1, and a power output shaft of the rotary motor drives the cantilever assembly 2 to rotate with respect to the vertical shaft.

Referring to FIGS. 1 to 4, in some embodiments, the article loading and unloading equipment further includes a linkage drive mechanism 6. The linkage drive mechanism 6 is arranged between the base assembly 1 and the cantilever assembly 2 to drive the cantilever assembly 2 to move relative to the base assembly 1 along a length direction thereof.

The linkage drive mechanism 6 is, for example, an electric motor, and the movement of the cantilever assembly 2 relative to the base assembly 1 along the length direction thereof is achieved by means of a power direction conversion mechanism or by directly using an electric motor that can output linear power. The cantilever assembly 2 moves in a straight line and can bring the conveying assembly 3 into motion toward or away from the article 14 so that the suction cup assembly 33 of the conveying assembly 3 is positioned at a distance from the article 14 that meets the adsorption requirement to achieve smooth adsorption.

Figure 7:
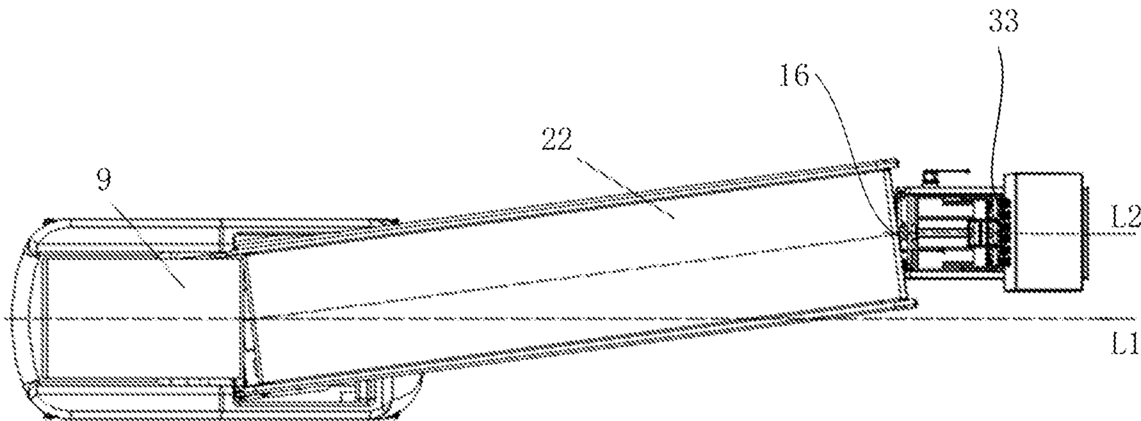
FIG. 7 is a schematic top-view diagram of the article loading and unloading equipment provided in some embodiments of the present disclosure in a state of use.

Referring to FIG. 7, in some embodiments, the article loading and unloading equipment further includes a pitch drive mechanism 7. The pitch drive mechanism 7 is arranged between the base assembly 1 and the cantilever assembly 2 to drive the cantilever assembly 2 to perform pitch rotation relative to the base assembly 1. The pitch drive mechanism 7 is, for example, a telescopic structure such as an oil cylinder or an electric cylinder, and extension and contraction of the pitch drive mechanism 7 causes the cantilever assembly 2 to rotate relative to the chassis 11, thereby implementing adjustment of the pitch attitude of the cantilever assembly 2.

In some embodiments, the article loading and unloading equipment further includes a support bracket 5. The support bracket 5 is in driving connection with the rotation drive mechanism 4; the first bracket assembly 21 is mounted to the support bracket 5; and the rotation drive mechanism 4 drives, through the support bracket 5, the cantilever assembly 2 to rotate relative to the base assembly 1. The cantilever assembly 2 is mounted together with the chassis 11 through the support bracket 5. With this configuration, the complexity of the mounting structure between the cantilever assembly 2 and the chassis 11 is improved, and the attitude adjustment can be implemented conveniently regardless of the type of the cantilever assembly 2.

Figure 6:
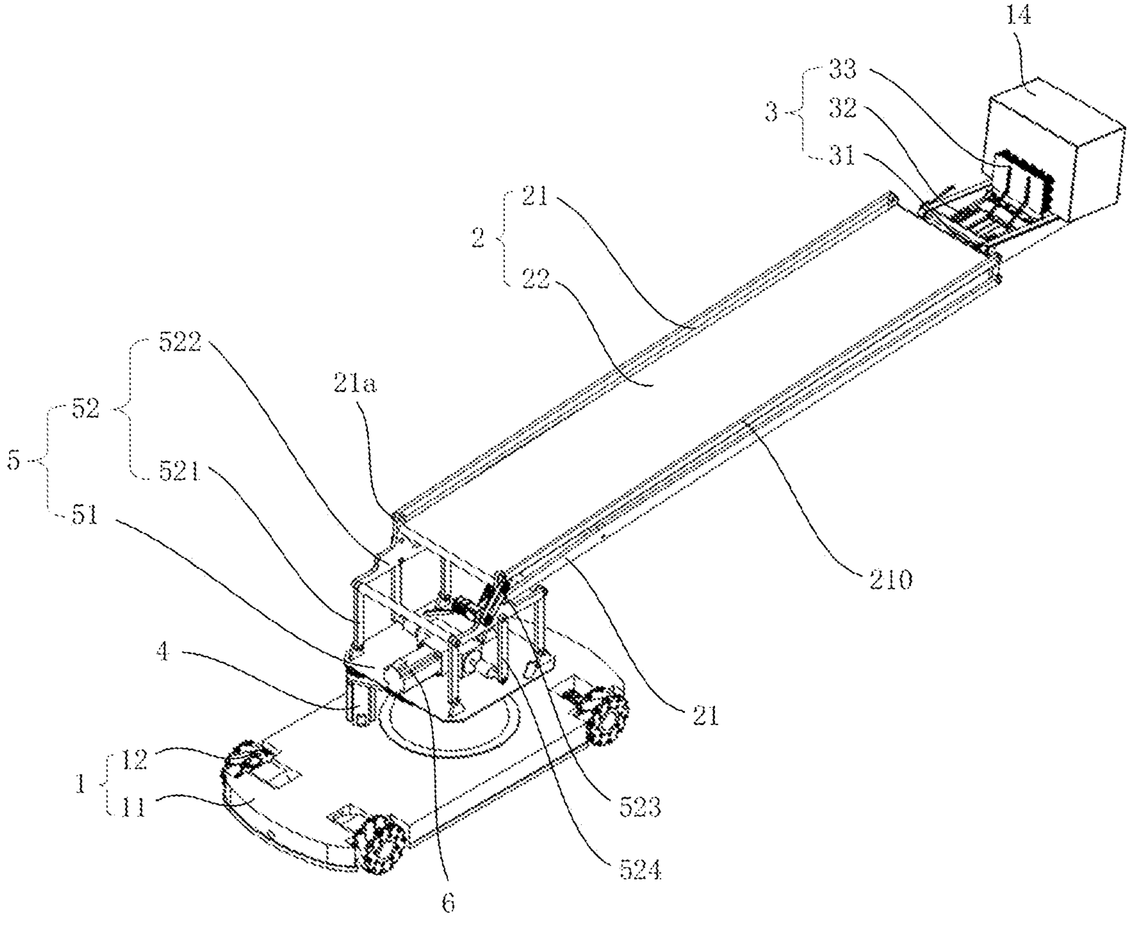
FIG. 6 is a schematic three-dimensional structure diagram of the article loading and unloading equipment provided in some embodiments of the present disclosure, from which side panels of a base assembly are removed.
Figure 8:
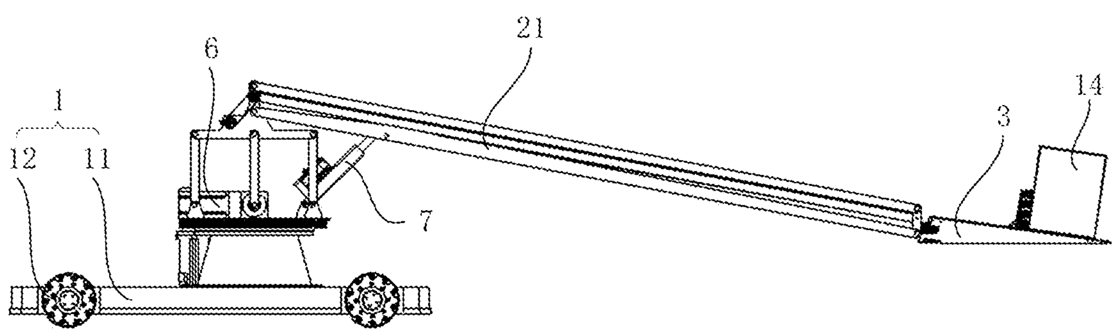
FIG. 8 is a schematic front-view diagram of the article loading and unloading equipment provided in the pitch state of some embodiments of the present disclosure in a pitch state.

Referring to FIGS. 6 and 8, in some embodiments, the support bracket 5 includes a base plate 51 and a first linkage mechanism 52. The rotation drive mechanism 4 is in driving connection with the base plate 51. The first linkage mechanism 52 is hinged to the base plate 51, and the first bracket assembly 21 is hinged to the first linkage mechanism 52. Rotation of the rotation drive mechanism 4 can cause the base plate 51, the first linkage mechanism 52 mounted to the base plate 51, the cantilever assembly 2 and the conveying assembly 3 to rotate simultaneously. The position of the conveying assembly 3 can be adjusted by rotating to meet different loading and unloading needs of side-door trucks 13 and rear-door trucks 13.

Referring to FIGS. 6 and 8, in some embodiments, the first linkage mechanism 52 includes at least three mutually parallel first rods 521 and a plurality of second rods 522. One end of each of the first rods 521 is hinged to the base plate 51. The other end of every two adjacent first rods 521 is hinged to the second rods 522; and the first bracket assembly 21 is hinged to the second rods 522. In some embodiments illustrated in FIGS. 6 and 8, the first linkage mechanism 52 includes four first rods 521 hinged to the base plate 51, and four second rods 522. Two of the second rods 522 have a larger width than that of the other two second rods 522. The two second rods 522 of a larger size are hinged together with the cantilever assembly 2 through auxiliary rods 523.

After the support bracket 5 is provided, in some embodiments, the linkage drive mechanism 6 is mounted in the following manner: the linkage drive mechanism 6 is mounted to the base plate 51 and is brought into driving connection with the second rods 522, and the linkage drive mechanism 6 is configured to drive, through the first linkage mechanism 52, the cantilever assembly 2 to move relative to the base assembly 1 along the length direction thereof. Referring to FIGS. 6 and 8, the linkage drive mechanism 6 uses a power output shaft that can output linear power, and the power output shaft is hinged to the second rods 522 through connecting rods 524. Two connecting rods are provided. One end of the two connecting rods 524 are hinged to the power output shaft, and the other end of the two connecting rods 524 are hinged to the second rods 522. The linkage drive mechanism 6 drives the second rods 522 to move such that the motion of the cantilever assembly 2 is approximately linear. The motion can meet the demand for adjustment along the length direction of the cantilever assembly 2, so it is not required that the cantilever assembly 2 performs completely linear motion, but it can oscillate slightly.

Figure 2:
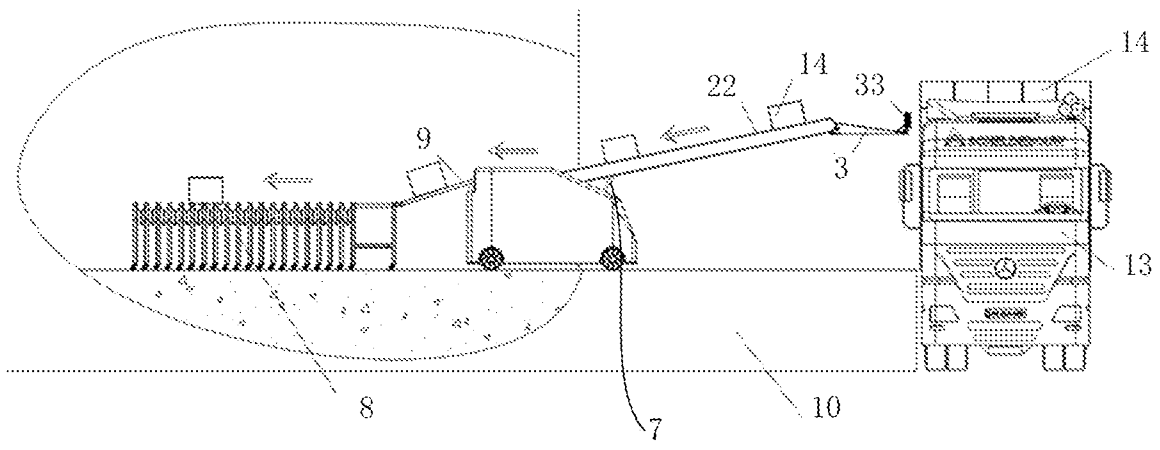
FIG. 2 is a schematic front-view diagram of the article loading and unloading system provided in some embodiments of the present disclosure in a state of use.
Figure 3:
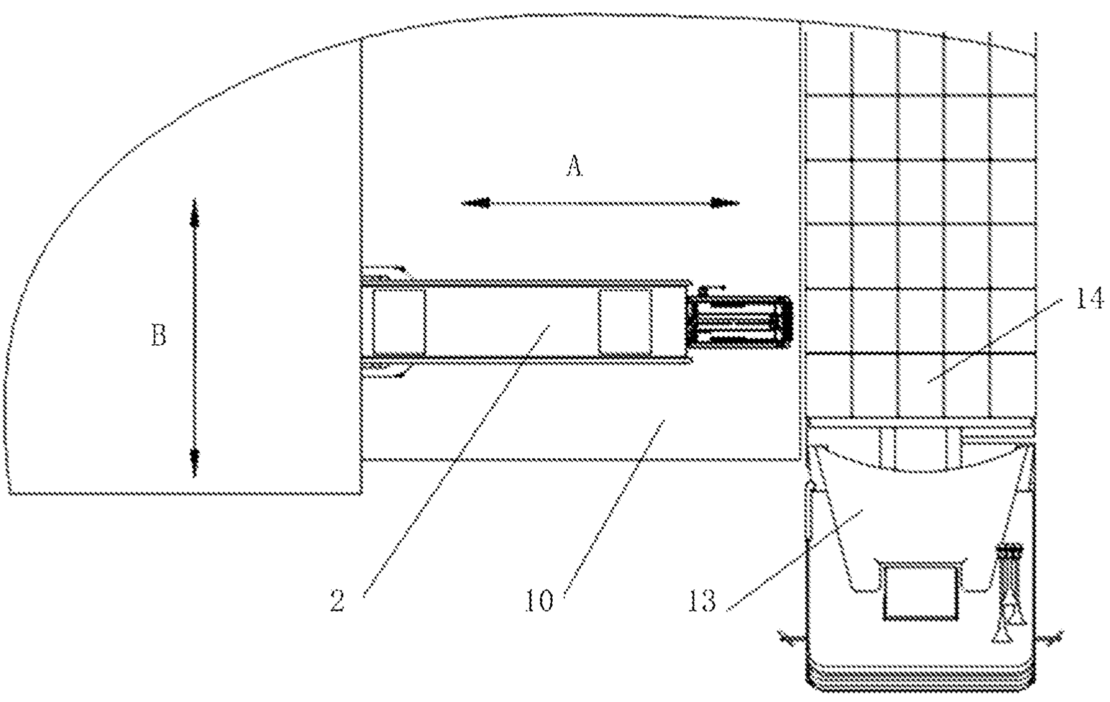
FIG. 3 is a schematic partial top-view diagram of the article loading and unloading system provided in some embodiments of the present disclosure in a state of use.
Figure 4:
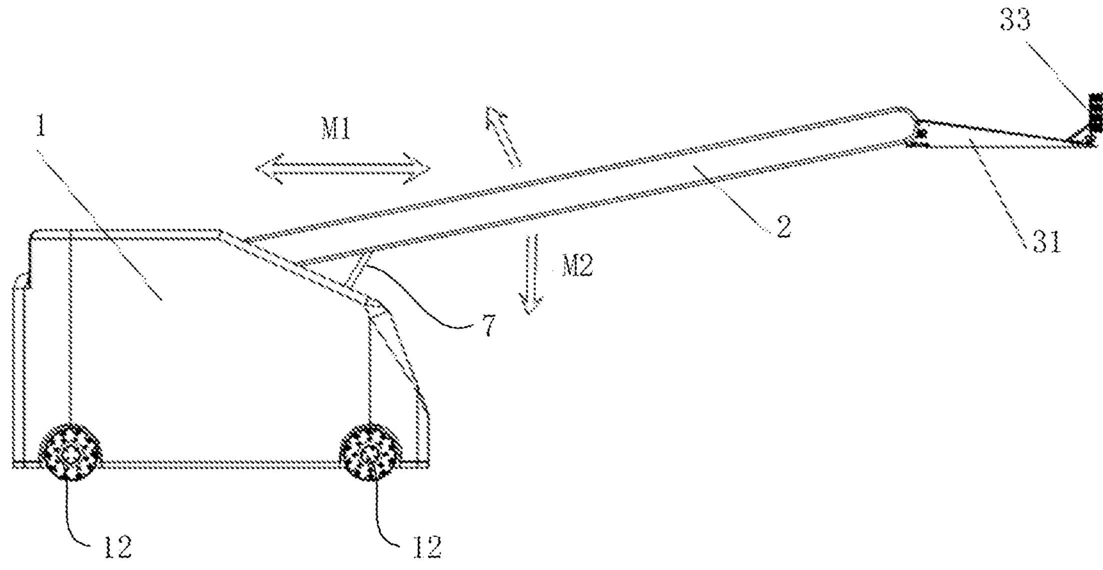
FIG. 4 is a schematic front-view structure diagram of the article loading and unloading equipment provided in some embodiments of the present disclosure.
Figure 5:
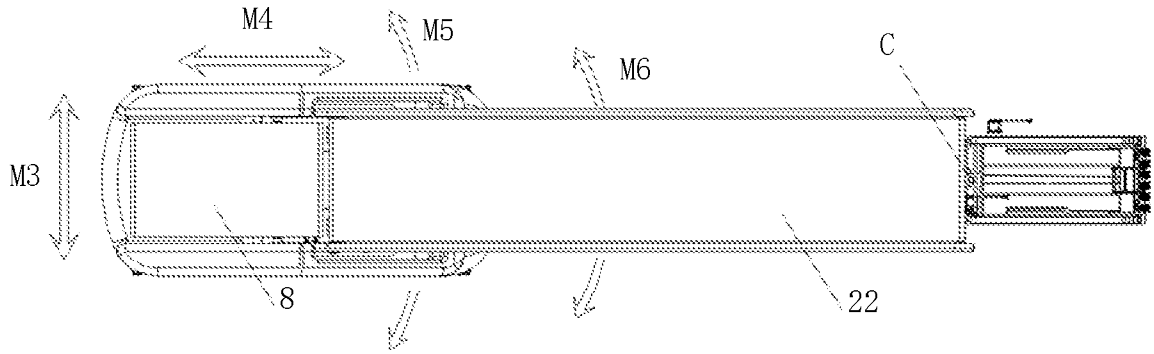
FIG. 5 is a schematic structure diagram of the article loading and unloading equipment provided in some embodiments of the present disclosure.

Still referring to FIGS. 6 and 8, in some embodiments, the pitch drive mechanism 7 is arranged between the base plate 51 and the cantilever assembly 2, or between the base assembly 1 and the cantilever assembly 2, and the pitch drive mechanism 7 is configured to drive the cantilever assembly 2 to perform pitch rotation relative to the base assembly 1. The pitch drive mechanism 7 is, for example, an oil cylinder, with a cylinder barrel of the oil cylinder being mounted to the base plate 51, and a piston rod of the oil cylinder being hinged to the cantilever assembly 2. Extension and contraction of the oil cylinder causes the cantilever assembly 2 to pitch. The cantilever assembly 2 can be adjusted to achieve at least one of the following: the conveying assembly 3 is below the second rods 522 as shown in FIG. 8, flush with the second rods 522, or above the second rods 522 as shown in FIG. 2.

Still referring to FIGS. 6 and 8, the implementation of the first bracket assembly 21 of the cantilever assembly 2 is described in detail below.

In some embodiments, the parallelogram mechanisms 210 include two sets. Two parallelogram mechanisms 210 in each set are arranged in parallel, and the two sets of parallelogram mechanisms 210 are also parallel. The first conveyor 22 is located between the two sets of parallelogram mechanisms 210, wherein the two parallelogram mechanisms 210 in each set are pivotally connected by four horizontal shafts **21*a*, and the horizontal shafts 21*a* are hinged to the second rods 522. During movement of the second rods 522 under the drive of a horizontal drive motor, the cantilever assembly 2 moves therewith. Since the first bracket assembly 21 of the cantilever assembly 2 uses the parallelogram mechanisms 210, vertical shafts are always vertically oriented no matter how the parallelogram mechanisms 210 of the cantilever assembly 2 move, so the attitude of the conveying assembly 3 connected to the vertical shafts on a side away from the chassis 11 is always in a state under the action of gravity, which enables the suction cup assembly 33 to better adsorb the article 14. In the above technical solution, the article loading and unloading equipment using the multi-degree-of-freedom cantilever structure with the parallel linkage structure in the cantilever can achieve that the front conveying assembly 3** ahead at any position is kept at the same horizontal angle and left-right angle, and thus is in a correct attitude for sucking a cargo box.

Still referring to FIGS. 6 and 8, the connection of the cantilever assembly 2 and the conveying assembly 3 is described in detail below.

In some embodiments, the second bracket assembly 31 is pivotally connected to the first bracket assembly 21. The pivotal connection is specifically implemented by using pin shafts, etc. A rear end of the second bracket assembly 31 of the conveying assembly 3 is connected to a front end of the cantilever assembly 2 by a hinge, such that the conveying assembly 3 can be parallel to the chassis 11 at all times when the cantilever assembly 2 performs left-right oscillations, and as the cantilever assembly 2 uses the parallel linkage structure therein, the horizontal angle of the conveying assembly 3 always remains the same regardless of the pitch angle of the cantilever assembly 2, so that a front end of the suction cup assembly 33 is always parallel to the article 14 when the cantilever performs left-right oscillations. Here, a side close to the truck 13 is a front end, and an end away from the truck 13 is a rear end.

Figure 9:
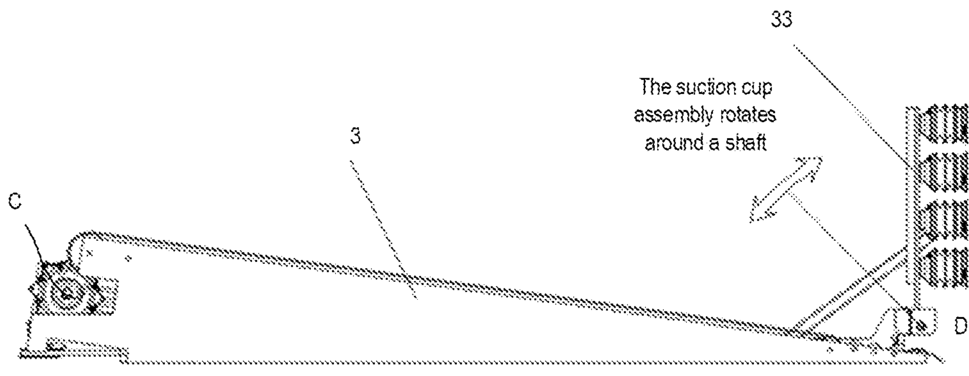
FIG. 9 a schematic diagram of a conveying assembly of the article loading and unloading equipment provided in some embodiments of the present disclosure.
Figure 10:
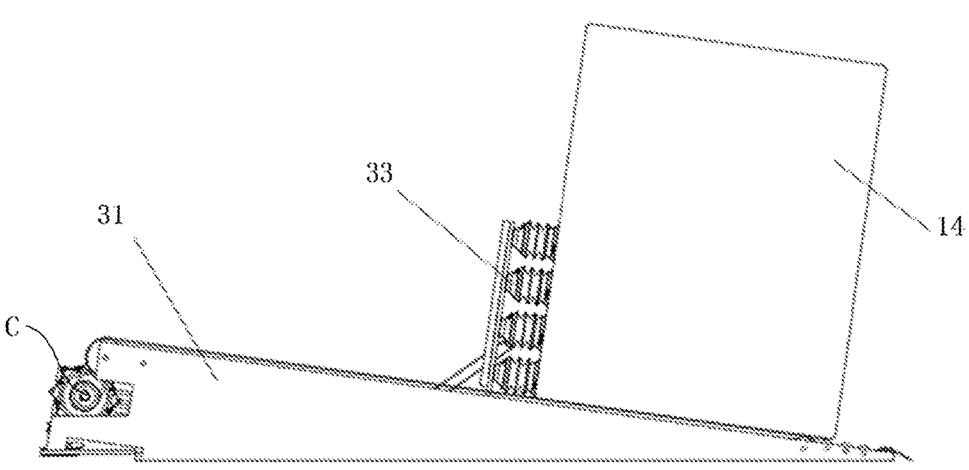
FIG. 10 a schematic diagram of adsorbing an article by the conveying assembly of the article loading and unloading equipment provided in some embodiments of the present disclosure.

Referring to FIGS. 9 and 10, in some embodiments, the article loading and unloading equipment further includes a horizontal rotation drive mechanism 16. The horizontal rotation drive mechanism 16 is arranged between the second bracket assembly 31 and the first bracket assembly 21 to drive the second bracket assembly 31 to rotate relative to the first bracket assembly 21 around a rotating shaft C, the rotating shaft C being vertically oriented. Using the horizontal rotation drive mechanism 16, the conveying assembly 3 as a whole is driven to rotate around the rotating shaft C relative to the cantilever assembly 2, so the attitude of the conveying assembly 3 can be actively adjusted so that the suction cup assembly 33 of the conveying assembly 3 is in a suitable position for adsorbing the article 14. A rotating shaft D in FIG. 9 is a rotating shaft around which the suction cup assembly rotates.

Under the drive of the horizontal rotation drive mechanism 16, the suction cup assembly 33 can performed controlled rotation around the shaft. Before absorbing the article 14, front end faces of the suction cups are parallel to a side of the article 14 and can rotate within a certain angle. When the article 14 is sucked and the article 14 is dragged onto the second conveyor 32, the suction cup assembly 33, the article 14 and the second conveyor 32 are in an angular state, and then the suction cup assembly 33 releases the article 14 and continues to move backward while rotating around the vertical shaft until the suction cup assembly 33 rotates completely below an upper surface of the second conveyor 32, and at this point, the suction cups are in the non-adsorbed position and the article 14 passes over the suction cup assembly 33 while being dragged by the second conveyor 32.

Referring to FIGS. 9 and 10, in some embodiments, the suction cup assembly 33 is mounted to the second bracket assembly 31, and the suction cup assembly 33 is configured to switch between the adsorbed position and the non-adsorbed position. The adsorbed position is a position where an adsorption surface of the suction cup assembly 33 faces toward the article 14, and the non-adsorbed position is a position where the adsorption surface of the suction cup assembly 33 faces away from the article 14. Illustrated in FIGS. 1 to 10 are schematic diagrams of the suction cup assembly 33 in the adsorbed position. When the suction cup assembly 33 is in the non-adsorbed position, the suction cup assembly 33 is located outside the motion trail of the article 14 on the second conveyor 32 so as not to interfere with the motion of the article 14 along the second conveyor 32. The switching of the suction cup assembly 33 between the adsorbed position and the non-adsorbed position can be implemented by cooperation of multiple drive sources.

To improve the work safety and intelligence of the equipment, a sensor (not shown) and (or) a vision system can be installed on the conveying assembly 3 to help a system locate the position of the articles 14 more accurately and quickly, thereby increasing efficiency.

In other embodiments of the present disclosure, provided is an article loading and unloading system including the article loading and unloading equipment provided in any technical solution of the present disclosure.

Referring to FIGS. 1 to 6, in some embodiments, the article loading and unloading system further includes a first conveying line 8. The first conveying line 8 is arranged on a side of the first conveyor 22 away from the second conveyor 32, and the conveying line is configured to convey an article 14 to the first conveyor 22 or to receive an article 14 conveyed from the first conveyor 22.

Referring to FIGS. 1 to 6, in order for the first conveying line 8 to better use the cantilever assembly 2 at different heights, in some embodiments, the article loading and unloading system further includes a second conveying line 9. The position of the first conveyor 22 is higher than that of the first conveying line 8, and the second conveying line 9 is arranged obliquely and located between the first conveying line 8 and the first conveyor 22. Referring to FIG. 7, a central axis L1 of the second conveying line 9 is parallel to a central axis L2 of the second conveyor 32.

The first conveying line 8, the second conveying line 9, and the article loading and unloading equipment are all located on a platform 10. The truck 13 is parked near the platform 10. The article loading and unloading equipment located on the platform 10 unloads articles 14 one by one from the truck 13 parked near the platform 10 and conveys the same to the first conveying line 8 behind connected thereto. The first conveying line 8 located on the platform 10, one end of the first conveying line 8 is connected to a rear end of the article loading and unloading equipment and the other end of the first conveying line 8 extends to the interior of a warehouse, and the first conveying line 8 can convey the articles 14 into the warehouse to implement unloading. Alternatively, articles 14 on the first conveying line 8 are conveyed one by one by the article loading and unloading equipment and stacked onto the truck 13 parked near the platform 10 to implement loading. In the above technical solution, the automation degree and efficiency of loading and unloading are greatly increased, and the adaptability to various loading and unloading working conditions is improved.

The working principle of the article loading and unloading system provided in the embodiments of the present disclosure is introduced below. The article loading and unloading system can work for the existing warehouse to perform automatic loading and unloading operations of articles 14.

In an example of automatic unloading, referring to FIG. 1, the truck 13 transporting articles 14 is parked near the warehouse platform 10. The article loading and unloading equipment is automatically or manually guided to a predetermined position on the platform 10, and a box type for the articles 14 is set or a stored stack type is retrieved, manually, according to the size of the truck 13 and the type of the articles 14. The cantilever assembly 2 of the article loading and unloading equipment positions the conveying assembly 3 to the uppermost one of a column of articles 14 on the truck 13 by pitch rotation, front-rear movements and (or) left-right oscillations, and the suction cup assembly 33 sucks and drags backward the article 14, and after the article 14 is dragged onto the second conveyor 32, the suction cup assembly 33 releases the article 14 and continues to move backward while rotating around the shaft until the suction cup assembly 33 rotates completely below the upper surface of the second conveyor 32.

Figure 11:
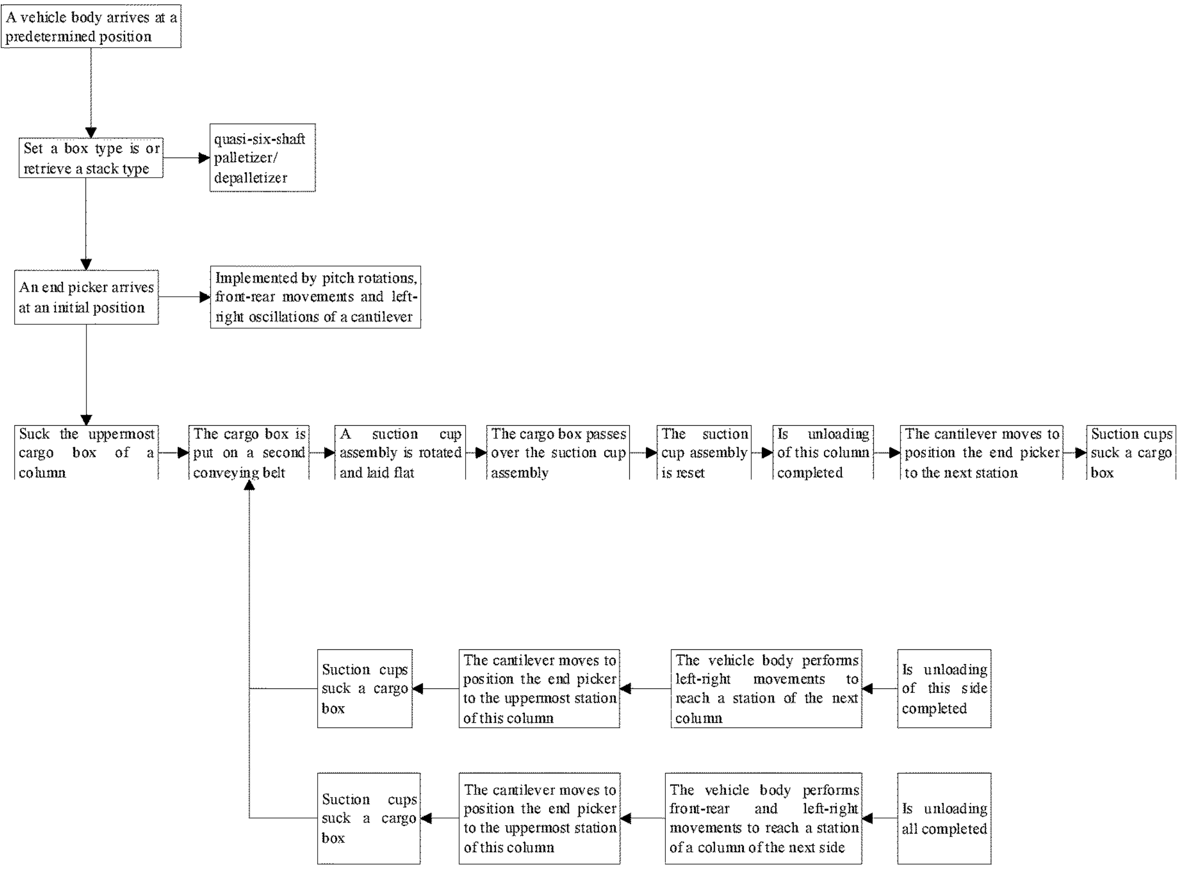
FIG. 11 is a schematic diagram of a workflow of an article loading and unloading system provided in some embodiments of the present disclosure.

Then, the second conveyor 32 continues to drag the article 14 backward over the suction cup assembly 33 and onto the first conveyor 22. The article 14 subsequently passes the first conveyor 22, the second conveying line 9 and the first conveying line 8 successively and arrives at the interior of the warehouse. After the article 14 passes over the suction cup assembly 33, the suction cup assembly 33 rotates reversely around the shaft while moving forward relative to the second conveyor 32, and at the same time, the cantilever assembly 2 positions the conveying assembly 3 to the next article 14 by pitch rotation and starts sucking and dragging operations of the next article 14. This process is performed cyclically until all of the articles 14 in this column are unloaded, then the chassis 11 moves left and right for positioning to the next column of articles 14, and all of the articles 14 in the next column are unloaded according to the above cycle until all of articles 14 on a side close to the article loading and unloading equipment are unloaded. The chassis 11 moves forward a certain distance for positioning to a column of articles 14, and unloading is performed again according to the above cycle until all articles 14 are unloaded. The workflow is shown in FIG. 11.

In the unloading process, the articles 14 are conveyed to the warehouse box by box, so a positioning device and (or) a vision system can also be connected behind the first conveying line 8, and equipment such as a palletizing robot are used to achieve automatic palletizing of multiple cargo boxes, which can greatly save labor and improve work efficiency. Similarly, in the loading process, in the case the articles 14 present in the warehouse are in a palletized state, the articles 14 can be placed one by one onto the first conveying line 8 by a depalletizing robot, and after being conveyed to the conveying assembly 3, the cargo boxes can be palletized one by one to the truck 13 by the article loading and unloading equipment, thus saving a lot of labor.

In description of the present disclosure, it needs to be appreciated that orientation or position relations denoted by the terms "center", "longitudinal", "transverse", "front", "rear", "left", "right", "vertical", "horizontal", "top", "bottom", "inner", "outer" and the like are orientation or position relations illustrated based on the drawings, are merely for the convenience of describing the present disclosure and simplifying description, instead of indicating or implying the denoted devices or elements must have specific orientations or be constructed and operated in specific orientations, and thus the terms cannot be construed as limiting the protection scope of the present disclosure.

Finally, it should be noted that the above embodiments are only used for describing rather than limiting the technical solutions of the present disclosure. Although the present disclosure is described in detail with reference to the preferred embodiments, those of ordinary skill in the art should understand that they still can make modifications to the specific implementations in the present disclosure or make equivalent substitutions to part of technical features thereof; and such modifications and equivalent substitutions should be encompassed within the scope of the technical solutions sought for protection in the present disclosure so long as they do not depart from the spirit of the technical solutions of the present disclosure.

The invention claimed is:

1. An article loading and unloading equipment, comprising:

a base assembly configured to provide support for the equipment;

a cantilever assembly comprising a first bracket assembly and a first conveyor, the first bracket assembly being mounted to the base assembly, and the first conveyor being mounted to the first bracket assembly;

a conveying assembly comprising a second bracket assembly, a second conveyor and a suction cup assembly, the second bracket assembly being mounted to the first bracket assembly, the second conveyor being mounted to the second bracket assembly, and the suction cup assembly being rotatably mounted to the second bracket assembly, and the suction cup assembly being configured to adsorb an article to the second conveyor, wherein a conveying direction of the first conveyor and a conveying direction of the second conveyor are the same;

a rotation drive mechanism arranged between the base assembly and the cantilever assembly to drive the cantilever assembly to rotate relative to the base assembly around a rotation shaft which is vertically oriented; and a support bracket in driving connection with the rotation drive mechanism, the first bracket assembly mounted to the support bracket, and the rotation drive mechanism driving, through the support bracket, the cantilever assembly to rotate relative to the base assembly;

wherein the support bracket comprises:

a base plate, the rotation drive mechanism in driving connection with the base plate; and a first linkage mechanism hinged to the base plate, and the first bracket assembly hinged to the first linkage mechanism.

2. The article loading and unloading equipment according to claim 1, wherein the first linkage mechanism comprises:

at least three mutually parallel first rods, one end of each of the first rods is hinged to the base plate; and a plurality of second rods, every two adjacent first rods being hinged to one of the second rods; and the first bracket assembly being hinged to the second rods.

3. The article loading and unloading equipment according to claim 2, further comprising:

a linkage drive mechanism mounted on the base plate and in driving connection with the second rods, the linkage drive mechanism being configured to drive, through the first linkage mechanism, the cantilever assembly to move relative to the base assembly along a length direction thereof.

4. The article loading and unloading equipment according to claim 2, wherein the first bracket assembly comprises:

two sets of parallelogram mechanisms, two parallelogram mechanisms in each set being arranged in parallel, and the first conveyor being located between the two sets of parallelogram mechanisms, wherein the parallelogram mechanisms in each set are pivotally connected by horizontal shafts, and the horizontal shafts are hinged to the second rods.

5. The article loading and unloading equipment according to claim 1, further comprising:

a pitch drive mechanism arranged between the base plate and the cantilever assembly, or between the base assembly and the cantilever assembly, the pitch drive mechanism being configured to drive the cantilever assembly to perform pitch rotation relative to the base assembly.

6. The article loading and unloading equipment according to claim 1, wherein the second bracket assembly is pivotally connected to the first bracket assembly.

7. The article loading and unloading equipment according to claim 6, further comprising:

a horizontal rotation drive mechanism arranged between the second bracket assembly and the first bracket assembly to drive the second bracket assembly to rotate relative to the first bracket assembly around a rotating shaft which is vertically oriented.

8. The article loading and unloading equipment according to claim 1, wherein the suction cup assembly is mounted to the second bracket assembly, and the suction cup assembly is configured to switch between an adsorbed position and a non-adsorbed position, wherein when the suction cup assembly is in the non-adsorbed position, the suction cup assembly is located outside a motion trail of the article on the second conveyor so as avoid interfering with the motion of the article along the second conveyor.

9. The article loading and unloading equipment according to claim 1, further comprising:

a linkage drive mechanism arranged between the base assembly and the cantilever assembly to drive the cantilever assembly to move relative to the base assembly along a length direction thereof.

10. The article loading and unloading equipment according to claim 1, further comprising:

a pitch drive mechanism arranged between the base assembly and the cantilever assembly to drive the cantilever assembly to perform pitch rotation relative to the base assembly.

11. The article loading and unloading equipment according to claim 1, wherein the base assembly comprises:

a chassis, the cantilever assembly being mounted to the chassis; and traveling wheels mounted to the chassis.

12. The article loading and unloading equipment according to claim 1, wherein the conveying direction of the first conveyor and the conveying direction of the second conveyor are the same, or an included angle between the conveying direction of the first conveyor and the conveying direction of the second conveyor is greater than 0° and less than or equal to 20°.

13. The article loading and unloading equipment according to claim 1, wherein the first conveyor comprises at least one of a conveying belt and a conveying roller; and/or the second conveyor comprises at least one of a conveying belt and a conveying roller.

14. An article loading and unloading system comprising the article loading and unloading equipment of claim 1.

15. The article loading and unloading system according to claim 14, further comprising:

a first conveying line arranged on a side of the first conveyor away from the second conveyor, the conveying line being configured to convey an article to the first conveyor or to receive an article conveyed from the first conveyor.

16. The article loading and unloading system according to claim 15, further comprising:

a second conveying line, the position of the first conveyor being higher than that of the first conveying line, the second conveying line being arranged obliquely and located between the first conveying line and the first conveyor.

* * * * *